(12) United States Patent
Ebisuzaki et al.

(10) Patent No.: US 11,258,069 B2
(45) Date of Patent: Feb. 22, 2022

(54) CURRENT COLLECTOR, BATTERY AND METHODS FOR PRODUCING THE SAME

(71) Applicant: TOYOTA JIDOSHA KABUSHIKI KAISHA, Toyota (JP)

(72) Inventors: Hideyo Ebisuzaki, Toyota (JP); Yasumasa Oguma, Tokyo-to (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 113 days.

(21) Appl. No.: 15/482,893

(22) Filed: Apr. 10, 2017

(65) Prior Publication Data

US 2017/0301921 A1 Oct. 19, 2017

(30) Foreign Application Priority Data

Apr. 14, 2016 (JP) .............................. JP2016-080965

(51) Int. Cl.
| | |
|---|---|
| *H01M 4/66* | (2006.01) |
| *H01M 4/70* | (2006.01) |
| *H01M 10/0525* | (2010.01) |
| *H01M 10/0585* | (2010.01) |
| *C23C 8/10* | (2006.01) |
| *H01M 4/02* | (2006.01) |

(52) U.S. Cl.
CPC .............. *H01M 4/661* (2013.01); *C23C 8/10* (2013.01); *H01M 4/70* (2013.01); *H01M 10/0525* (2013.01); *H01M 10/0585* (2013.01); *H01M 2004/021* (2013.01); *H01M 2220/20* (2013.01); *H01M 2220/30* (2013.01)

(58) Field of Classification Search
CPC ..... H01M 4/661; H01M 4/70; H01M 10/0585
See application file for complete search history.

(56) References Cited

U.S. PATENT DOCUMENTS

| | | | |
|---|---|---|---|
| 9,166,230 B1* | 10/2015 | Lahiri | H01M 10/4235 |
| 2002/0061446 A1* | 5/2002 | Gan | H01M 4/06 |
| | | | 429/231.8 |
| 2008/0003493 A1* | 1/2008 | Bates | H01M 2/0207 |
| | | | 429/66 |

FOREIGN PATENT DOCUMENTS

| | | |
|---|---|---|
| CN | 102394305 A | 3/2012 |
| JP | H-07220755 A | 8/1995 |
| JP | 2001357854 A | 12/2001 |
| JP | 2015204221 A | 11/2015 |

* cited by examiner

*Primary Examiner* — Ula C Ruddock
*Assistant Examiner* — Frank A Chernow
(74) *Attorney, Agent, or Firm* — Dickinson Wright, PLLC

(57) ABSTRACT

A current collector in which, even in the case of using a copper substrate, an electroconductive layer comprising a thermoplastic resin and an electroconductive material and covering the copper substrate provides the same positive temperature coefficient resistance function as the case of using an aluminum substrate. The current collector may comprise: a copper substrate comprising a copper oxide layer that an average content of an oxygen element present within a thickness of 1.0 μm or less from a surface of the copper substrate, is 10.5 at % or more, and a positive temperature coefficient resistance layer comprising a thermoplastic resin and an electroconductive material and covering the copper oxide layer of the copper substrate.

3 Claims, 1 Drawing Sheet

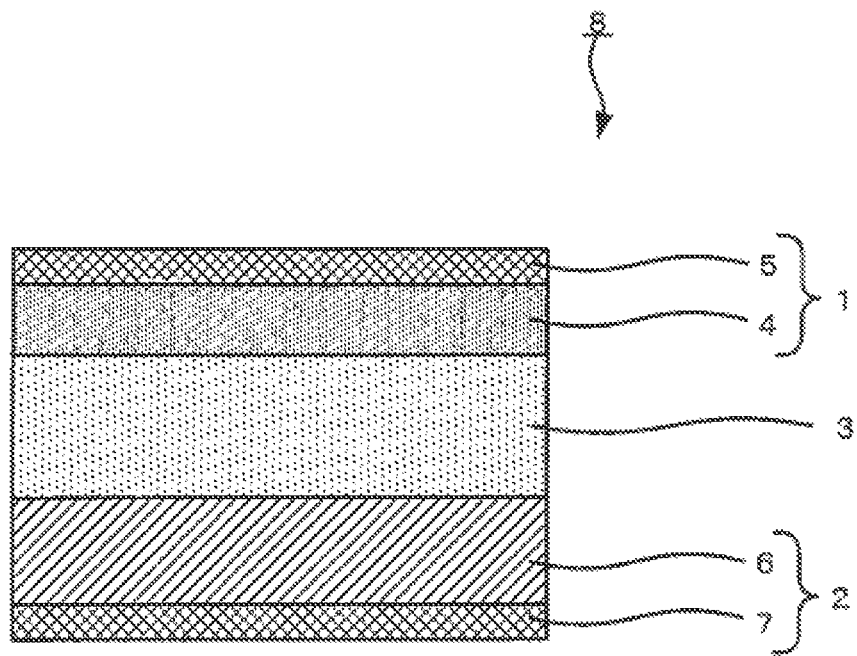

CURRENT COLLECTOR, BATTERY AND METHODS FOR PRODUCING THE SAME

RELATED APPLICATION

This application claims priority to Japanese Patent Application No. 2016-080965, flied on Apr. 14, 2016, including the specification, drawings and abstract, the entire disclosure of which is incorporated herein by reference.

TECHNICAL FIELD

The disclosure relates to a current collector, a battery and methods for producing the same.

BACKGROUND ART

A battery that is used as an in-vehicle power source or as a power source of personal computers and mobile devices, may be overheated when it is inappropriately used (e.g., short-circuit, overcharging) and may have a negative influence on the battery itself or on a device using the battery. Especially, with the advancement of technology, recent batteries have higher energy density and generate a large amount of heat. Therefore, measures against the inappropriate use of the batteries are very important.

A nonaqueous secondary battery is disclosed in Patent Literature 1, the battery comprising a current collector which has a positive temperature coefficient resistor function that increases a resistance value when the battery is heated to more than a predetermined temperature, and in which a surface thereof is covered with an electroconductive layer comprising a crystalline thermoplastic resin, an electroconductive material and a binder.

In "EXAMPLES" in Patent Literature 1, there is a description of batteries produced by use of aluminum and copper expand metals as the cathode and anode current collectors, respectively.

Patent Literature 1: Japanese Patent Application Laid-Open No. 2001-357854

SUMMARY

However, it has been found that such a current collector that a surface of an untreated copper substrate is covered with an electroconductive layer comprising a thermoplastic resin and an electroconductive material, has a lower positive temperature coefficient resistance (PTC) function compared to such a current collector that a surface of an aluminum substrate is covered with an electroconductive layer comprising a thermoplastic resin and an electroconductive material.

The disclosed embodiments were achieved in light of the above circumstance. An object of the disclosed embodiments is to provide a current collector in which, even in the case of using a copper substrate, an electroconductive layer comprising a thermoplastic resin and an electroconductive material and covering the copper substrate can provide the same positive temperature coefficient resistance function as the case of using an aluminum substrate.

In a first embodiment, there is provided a current collector comprising: a copper substrate comprising a copper oxide layer that an average content of an oxygen element present within a thickness of 1.0 μm or less from a surface of the copper substrate, is 10.5 at % or more, and a positive temperature coefficient resistance layer comprising a thermoplastic resin and an electroconductive material and covering the copper oxide layer of the copper substrate.

The average content of the oxygen element may be 50 at % or less.

In another embodiment, there is provided a battery comprising an anode current collector, which is the current collector as set forth above, an anode mixture layer, an electrolyte layer, a cathode mixture layer and a cathode current collector, wherein the positive temperature coefficient resistance layer of the anode current collector and the anode mixture layer are in contact with each other.

In another embodiment, there is provided a method for producing the current collector as set forth above, the method comprising: oxidizing a copper substrate by heat-treating the copper substrate at 160° C. or more in a presence of an oxidizing gas, and covering the oxidized copper substrate with a positive temperature coefficient resistance layer comprising a thermoplastic resin and an electroconductive material.

In the oxidizing of the copper substrate, the copper substrate may be heat-treated at 160° C. or more for one or more hours under an air atmosphere.

In another embodiment, there is provided a method for producing a battery comprising an anode current collector, an anode mixture layer, an electrolyte layer, a cathode mixture layer and a cathode current collector, the method comprising: attaching the anode current collector, which is the current collector as set forth above, and the anode mixture layer so that the positive temperature coefficient resistance layer of the anode current collector and the anode mixture layer are in contact with each other, attaching the anode mixture layer and the electrolyte layer, attaching the electrolyte layer and the cathode mixture layer, and attaching the cathode mixture layer and the cathode current collector.

According to the disclosed embodiments, by the use of the copper substrate comprising the copper oxide layer that the average content of the oxygen element present within a thickness of 1.0 μm or less from the surface of the copper substrate, is 10.5 at % or more, the current collector in which the electroconductive layer comprising the thermoplastic resin and the electroconductive material and covering the copper oxide layer of the oxidized copper-substrate provides the same positive temperature coefficient resistance function as the case of using the aluminum substrate, can be provided.

BRIEF DESCRIPTION OF THE DRAWING

FIG. 1 is a schematic view of the basic structure of the battery of the disclosed embodiments.

DETAILED DESCRIPTION

The current collector according to the disclosed embodiments is a current collector comprising: a copper substrate comprising a copper oxide layer that an average content of an oxygen element present within a thickness of 1.0 μm or less from a surface of the copper substrate, is 10.5 at % or more, and a positive temperature coefficient resistance layer comprising a thermoplastic resin and an electroconductive material and covering the copper oxide layer of the copper substrate.

It is known that an electroconductive layer comprising a thermoplastic resin and an electroconductive material shows such a positive temperature coefficient resistance (PTC) function that when it is heated to more than the melting point of the thermoplastic resin, there is a rapid increase in resistance value. This is because, since the thermoplastic resin is expanded by heating, the particles of the electroconductive material which are in contact with each other, are detached from each other and cause an interruption of current.

In the case of a current collector in which a substrate made of an electroconductive material or the like is covered with an electroconductive layer comprising a thermoplastic resin and an electroconductive material, when heat is generated in a battery by overcharging or a short circuit, the transfer of electrons from electrodes to the above-mentioned current collector is interrupted and stops an electrochemical reaction. Therefore, further heat generation is suppressed, and a negative influence on the battery itself and devices using the battery can be prevented.

However, the researchers of the disclosed embodiments found that in the case of covering a surface of an untreated copper substrate with an electroconductive layer comprising a thermoplastic resin and an electroconductive material, a lower positive temperature coefficient resistance function is obtained compared to a current collector in which a surface of an aluminum substrate is covered with an electroconductive layer comprising a thermoplastic resin and an electroconductive material. This is considered to be because the polymer chains of the thermoplastic resin are reduced/cut by the reduction function of copper, and the thermoplastic resin is less likely to expand even in an overheated condition.

In the disclosed embodiments, by oxidizing the surface of the copper substrate to be used in advance, the reduction function of copper is eliminated to prevent the polymer chains of the thermoplastic resin from being cut. Therefore, even in the case of using the copper substrate, the electroconductive layer comprising the thermoplastic resin and the electroconductive material can provide the same positive temperature coefficient resistance function as the case of using the aluminum substrate.

In Patent Literature 1, it is mentioned that a battery comprising a cathode current collector, which is made of aluminum and is covered with an electroconductive layer comprising a crystalline thermoplastic resin, an electroconductive material and a binder, and an anode current collector, which is made of copper and is covered with the electroconductive layer, could prevent overheating that is due to an inappropriate use of the battery. It is considered that the reason why the battery mentioned in Patent Literature 1 could prevent overheating is largely due to the current interruption effect between the aluminum cathode current collector and the cathode active material, and the current interruption effect between the copper anode current collector and the anode active material was small.

Hereinafter, the current collector, battery and methods for of producing the same disclosed embodiments will be further described in this order.

1. Current Collector

The current collector of the disclosed embodiments comprises: the copper substrate comprising the copper oxide layer that the average content of the oxygen element present within a thickness of 1.0 µm or less from the surface of the copper substrate, is 10.5 at % or more, and the positive temperature coefficient resistance layer comprising the thermoplastic resin and the electroconductive material and covering the copper oxide layer of the copper substrate.

The copper substrate used for the current collector of the disclosed embodiments, comprises the copper oxide layer that the average content of the oxygen element present within a thickness of 1.0 µm or less from the surface of the copper substrate, is 10.5 at % or more.

By the use of the copper substrate comprising the copper oxide layer that the average content of the oxygen element present within a thickness of 1.0 µm or less from the surface of the copper substrate, is 10.5 at % or more, the copper in the copper substrate is not allowed to reduce the thermoplastic resin and cut the polymer chains.

The above-mentioned average content may be the average content of the oxygen element present within a thickness of 1.0 µm or less from the surface of the copper substrate; therefore, a range within 1.0 µm in a depth direction from the surface may be in a uniformly oxidized state, or it may be in a non-uniform state. As the non-uniform state, examples include, but are not limited to, a state in which the oxygen content gradually decreases from the surface. To sufficiently inhibit the reduction function even in such a non-uniform state, the average content of the oxygen element may be 13 at % or more, or it may be 15 at % or more.

The upper limit of the average content of the oxygen element present within a thickness of 1.0 µm or less from the surface of the copper substrate, is not particularly limited. Considering the need to obtain at least a certain level of electroconductivity so as not to interrupt the transfer of electrons from the electrode active materials to the inside of the copper substrate, the average content of the oxygen element may be 50 at % or less, or it may be 20 at % or less.

In a range exceeding a thickness of more than 1.0 µm from the surface of the copper substrate, the average content of the oxygen element is not particularly limited. From the viewpoint of obtaining electroconductivity, the average content of the oxygen element may be 50 at % or less, or it may be 20 at % or less.

In the disclosed embodiments, "comprising a copper oxide layer that an average content of an oxygen element present within a thickness of 1.0 µm or less from a surface of the copper substrate, is 10.5 at % or more" also encompasses the case where the average content of the oxygen element present in the range exceeding a thickness of more than 1.0 µm from the surface of the copper substrate, is 10.5 at % or more. That is, a clear difference is not needed to be found between the average content of the oxygen element present within a thickness of 1.0 µm or less from the surface of the copper substrate and the average content of the oxygen element present in the range exceeding a thickness of more than 1.0 µm from the surface of the copper substrate. Therefore, the copper substrate comprising the copper oxide layer that the average content of the oxygen element present within a thickness of 1.0 µm or less from the surface of the copper substrata, is 10.5 at % or more, encompasses such a copper substrate that the average content of the oxygen element in the whole copper substrate is uniformly 10.5 at % or more.

The method for measuring the average content of the oxygen element present within a thickness of 1.0 µm or less from the surface of the copper substrate, is not particularly limited. The method may be scanning electron microscope/energy dispersive x-ray spectroscopy (SEM/EDX) since it can correctly and easily measure the average content of the oxygen element present within a thickness of 1.0 µm or less from the surface of the copper substrate.

The thickness from the surface of the object for which the average content of the oxygen element is measured by SEM/EDX (analysis range: Zm) can be obtained by Castaing's formula represented by the following formula (1):

$$Zm(\mu m)=0.033(V_0 1.7-Vk 1.7)A/\rho Z \quad \text{Formula (1)}$$

In the formula (1), $V_0$ is accelerating voltage (kV); Vk is critical excitation voltage (kV); A is atomic weight; ρ is density (g/cm³); and Z is atomic number.

To correctly measure the average content of the oxygen element present within a thickness of 1.0 μm or less from the surface of the copper substrate, among the SEM/EDX measurement conditions, the accelerating voltage is needed to be set to 20 kV.

The form of the copper substrate is not particularly limited. As the form, examples include, but are not limited to, a rod form, a plate form, a foil form and a mesh form. The copper substrate may be in a foil form because the energy density of the battery can be increased. A battery case may function as the current collector.

The copper substrate used for the current collector of the disclosed embodiments is not particularly limited, as long as it comprises the copper oxide layer that the average content of the oxygen element present within a thickness of 1.0 μm or less from the surface of the copper substrate, is 10.5 at % or more. As the copper substrate, examples include, but are not limited to, such a copper substrate that the whole surface is covered with the copper oxide layer. In the case of a copper substrate in a plate or foil form, only a surface of the substrate which is, when the current collector of the disclosed embodiments is incorporated in a battery, in contact with the anode or anode mixture layer, may be covered with the copper oxide layer.

In the current collector of the disclosed embodiments, the copper oxide layer of the copper substrate is covered with the positive temperature coefficient resistance layer comprising the thermoplastic resin and the electroconductive material.

The thermoplastic resin used for the current collector of the disclosed embodiments, has such a property that it expands when it is heated to more than its melting point. However, as described above, once the thermoplastic resin is reduced to cut the polymer chains, it is less likely to expand even when it is overheated; therefore, the positive temperature coefficient resistance function decreases.

The thermoplastic resin is not particularly limited. As the thermoplastic resin, examples include, but are not limited to, thermoplastic resins such as polypropylene, polyethylene, polyvinylchloride, polyvinylidene fluoride (PVDF), polystyrene, ABS resin, methacryl resin, polyamide, polyester, polycarbonate and polyacetal. These thermoplastic resins may be used alone or in combination of two or more kinds.

From the viewpoint of melting point and ease of processing, the thermoplastic resin may be polyvinylidene fluoride or polyethylene, and it also may be polyvinylidene fluoride.

The content of the thermoplastic resin in the positive temperature coefficient resistance layer is not particularly limited. When the whole positive temperature coefficient resistance layer is determined as 100 volt, the content of the thermoplastic resin may be 5 to 90 volt, and it also may be 10 to 80 volt.

In the range of temperatures at which the battery is expected to be used, the electroconductive material used for the current collector of the disclosed embodiments is contained in the positive temperature coefficient resistance layer, in such a state that the particles of the electroconductive material are in contact with each other. As described above, once the thermoplastic resin is expanded by heating, the particles of the electroconductive material are detached from each other and, as a result, the electrical resistance of the positive temperature coefficient resistance layer increases.

The electroconductive material is not particularly limited, as long as it has electroconductivity. As the electroconductive material, examples include, but are not limited to, carbonaceous materials such as carbon black, activated carbon, carbon fibers (e.g., carbon nanotubes and carbon nanofibers) and graphite.

The content of the electroconductive material in the positive temperature coefficient resistance layer is not particularly limited. When the whole positive temperature coefficient resistance layer is determined as 100 volt, the content of the electroconductive material may be 5 volt or more, and it also may be 10 volt or more.

Also, the content ratio of the thermoplastic resin and electroconductive material in the positive temperature coefficient resistance layer is not particularly limited. When the thermoplastic resin has weak binding force, the positive temperature coefficient resistance layer may contain a binder resin, etc.

The current collector of the disclosed embodiments is not particularly limited, as long as it is in such a state that the polymer chains of the thermoplastic resin is inhibited from being cut by the reduction function of copper, and as long as it has such a structure that the copper oxide layer of the copper substrate is covered with the positive temperature coefficient resistance layer so as to interrupt an electron flow between the active materials and the current collectors when heated. For example, as described above, when the copper substrate is such a copper substrate that it is in a foil or plate form and it has the copper oxide layer only on the surface that is in contact with the cathode or anode mixture layer, it may have such a structure that only the surface having the copper oxide layer thereon is covered with the positive temperature coefficient resistance layer. When the copper substrate is such a copper substrate that it is in a rod or mesh form and the whole surface is covered with the copper oxide layer, it may have such a structure that the whole copper substrate is covered with the positive temperature coefficient resistance layer.

Also, the thickness of the positive temperature coefficient resistance layer is not particularly limited, as long as it can provide a positive temperature coefficient resistance function. From the viewpoint of energy density, it may be 10 μm or less, and it also may be about 1.0 μm.

The current collector of the disclosed embodiments can be used as the current collector of the cathode and anode. Since copper has poor stability at high potential, the current collector of the disclosed embodiments may be used as the current collector of the anode in high-potential lithium ion batteries, etc.

2. Battery

The basic structure of the battery of the disclosed embodiments will be described with reference to FIG. 1.

As shown in FIG. 1, a battery 8 of the disclosed embodiments comprises an anode current collector 5, which is the above-described current collector of the disclosed embodiments, an anode mixture layer 4, an electrolyte layer 3, a cathode mixture layer 6 and a cathode current collector 7.

FIG. 1 is a schematic view of an example of a battery having a laminated structure. The battery of the disclosed embodiments is not limited to the battery having the laminated structure, and it may be a battery in a general form such as a coin form, a flat plate form or a cylindrical form.

In FIG. 1, the battery is schematically shown as a single cell. However, the battery may be a cell assembly comprising a plurality of cells. As the cell assembly, examples include, but not limited to, a cell stack comprising a plurality of stacked flat plate cells.

In the battery of the disclosed embodiments, the above-described current collector of the disclosed embodiments is used as the anode current collector. The anode current collector collects current from the anode mixture layer. The current collector of the disclosed embodiments will not be described here since it is described above.

The battery of the disclosed embodiments comprises the anode mixture layer which is in contact with the positive temperature coefficient resistance layer of the anode current collector. On the surface where the anode current collector and the anode mixture layer are in contact with each other, the positive temperature coefficient resistance layer is disposed between the copper substrate and the anode mixture layer.

The anode mixture layer comprises at least an anode active material. As needed, it may further comprise a binder and an electroconductive material. The anode active material is not particularly limited, as long as it is one that is generally applicable to batteries. As the anode active material, examples include, but are not limited to, carbonaceous materials, lithium alloys, oxides and nitrides when ions to be transferred are lithium ions.

In the battery of the disclosed embodiments, the current collector of the disclosed embodiments comprising the positive temperature coefficient resistance layer is used as the anode current collector; therefore, on the surface where the anode active material and the anode current collector are in contact with each other, electron transfer is interrupted when heat generation is caused by overheating that is due to an inappropriate use of the battery. Therefore, the electrochemical reaction is stopped, and the overheating of the whole battery can be prevented.

The battery of the disclosed embodiments comprises the electrolyte layer disposed between the above-described anode mixture layer and the below-described cathode mixture layer. The electrolyte layer is not particularly limited, as long as it can conduct transferring ions. As the electrolyte layer, examples include, but are not limited to, a polymer solid electrolyte, an oxide solid electrolyte, a sulfide solid electrolyte, and a porous separator impregnated with an aqueous or non-aqueous electrolyte.

The battery of the disclosed embodiments comprises the cathode mixture layer that is in contact with the electrolyte layer.

In the disclosed embodiments, the cathode mixture layer comprises at least a cathode active material. As needed, it may further comprise a binder and an electroconductive material. The cathode active material is not particularly limited, as long as it is one that is generally applicable to in batteries. As the cathode active material, examples include, but are not limited to, compounds having a layered structure (such as $LiCoO_2$ and $LiNiO_2$), compounds having a spinel structure (such as $LiMn_2O_4$) and compounds having an olivine structure (such as $LiFePO_4$) when ions to be transferred are lithium ions.

The battery of the disclosed embodiments comprises the cathode current collector that is in contact with the cathode mixture layer. The material for the cathode current collector is not particularly limited. It may be a material that can efficiently transfer electrons to/from the cathode active material in the cathode mixture layer and that is electrochemically and chemically stable.

3. Method for Producing the Current Collector

The method for producing the current collector of the disclosed embodiments comprises: oxidizing the copper substrate by heat-treating the copper substrate at 160° C. or more in the presence of the oxidizing gas, and covering the oxidized copper substrate with the positive temperature coefficient resistance layer comprising the thermoplastic resin and the electroconductive material.

According to the current collector production method of the disclosed embodiments, in the oxidizing, the copper substrate is oxidized by heat-treating the copper substrate at 160° C. or more in the presence of the oxidizing gas. Therefore, the polymer chains of the thermoplastic resin can be inhibited from being cut by the reduction function of the copper substrate, and the current collector having the same positive temperature coefficient resistance function as the case of using the aluminum substrate, can be produced.

The oxidizing is not particularly limited, as long as the copper substrate can be oxidized by heating at 160° C. or more in the presence of the oxidizing gas. For example, the copper substrate may be heated under the oxidizing gas atmosphere or in such a condition that the oxidizing gas flows around the copper substrate. Since the copper substrate can be oxidized with a simple device, the air, which is an oxygen-containing gas, may be used as the oxidizing gas. The heating time is not particularly limited. To form the copper oxide layer that the average content of the oxygen element present within a thickness of 1.0 μm or less from the surface of the copper substrate, is 10.5 at % or more, the copper substrate may be heated at 160° C. or more for one or more hours.

According to the current collector production method of the disclosed embodiments, in the covering, the oxidized copper substrate is covered with the positive temperature coefficient resistance layer comprising the thermoplastic resin and the electroconductive material.

The method for covering the oxidized copper substrate with the positive temperature coefficient resistance layer is not particularly limited. In general, the thermoplastic resin and the electroconductive material are dispersed in a non-aqueous solvent, and the resulting dispersion is casted on the oxidized copper substrate and dried. To uniformly cover the oxidized copper substrate with the positive temperature coefficient resistance layer, the solid content concentration of the dispersion containing the thermoplastic resin and the electroconductive material may be about 10 mass %.

4. Method for Producing the Battery

The method for producing the battery comprising the anode current collector, the anode mixture layer, the electrolyte layer, the cathode mixture layer and the cathode current collector of the disclosed embodiments, comprises: attaching the anode current collector, which is the current collector of the disclosed embodiments, and the anode mixture layer so that the positive temperature coefficient resistance layer of the anode current collector and the anode mixture layer are in contact with each other, attaching the anode mixture layer and the electrolyte layer, attaching the electrolyte layer and the cathode mixture layer, and attaching the cathode mixture layer and the cathode current collector.

According to the battery production method of the disclosed embodiments, a structure that can function as a battery can be obtained. Moreover, due to comprising the current collector of the disclosed embodiments which comprises the positive temperature coefficient resistance layer as the anode current collector, the battery of the disclosed embodiments which has an excellent function of preventing overheating that is due to an inappropriate use of the battery, can be produced.

In the attaching of the anode current collector (the current collector of the disclosed embodiments) and the anode mixture layer, they are attached so that the positive temperature coefficient resistance layer is disposed between the copper substrate and the anode mixture layer.

The order of processes for attaching the components is not particularly limited. For example, in the case of producing a laminated battery, the anode mixture layer, the electrolyte layer, the cathode mixture layer and the cathode current collector may be laminated on the anode current collector in this order. Also, after attaching the anode current collector and the anode mixture layer and attaching the cathode current collector and the cathode mixture layer, they may be attached so that the electrolyte layer is disposed between the anode mixture layer and the cathode mixture layer.

EXAMPLES

Hereinafter, the disclosed embodiments will be described in more detail by way of examples and comparative examples. The scope of the disclosed embodiments is not limited to the following examples.
1. Evaluation of Current Collector Properties
<Production of Current Collector>

Example 1

A copper foil having a thickness of 15 μm was placed in a stationary heat treatment furnace. The temperature inside the furnace was increased to 160° C. at a heating rate of 5° C./min. After the temperature reached 160° C., the temperature inside the furnace was kept at 160° C. for 60 minutes and then gradually cooled down. Since the stationary heat treatment furnace was an open type furnace, the inside of the furnace was filled with the air even during the heating.

A furnace black powder having an average primary particle diameter of 66 nm (manufactured by: Tokai Carbon Co., Ltd.) as an electroconductive material and a PVDF resin (product name: KF Polymer L #9130, manufactured by: Kureha Corporation) as a thermoplastic resin, were dispersed in N-methyl-2-pyrrolidone (NMP) at volume ratio of 20:80. The solid content concentration of the furnace black powder and the PVDF resin was set to 11 mass.

The dispersion of the furnace black powder and the PVDF resin was applied onto the copper substrate heat-treated at 160° C. Then, it was dried in a stationary drying furnace at 100° C. for one hour to form an electroconductive layer, thereby obtaining the current collector of Example 1.

Example 2

The current collector of Example 2 was produced in the same manner as Example 1, except that the copper foil was heat-treated at 200° C.

Example 3

The current collector of Example 3 was produced in the same manner as Example 1, except that the copper foil was heat-treated at 220° C.

Comparative Example 1

The current collector of Comparative Example 1 was produced in the same manner as Example 1, except that an aluminum foil having a thickness of 15 μm was used in place of the copper foil, and the aluminum foil was not heat-treated.

Comparative Example 2

The current collector of Comparative Example 2 was produced in the same manner as Example 1, except that the copper foil was not heat-treated.

Comparative Example 3

The current collector of Comparative Example 3 was produced in the same manner as Example 1, except that the copper foil was heat-treated at 120° C.

Comparative Example 4

The current collector of Comparative Example 4 was produced in the same manner as Example 1, except that the copper foil was produced at 140° C.
<Evaluation of Resistance at the Time of Overheating>

Each of the current collectors obtained in Examples 1 to 4 and Comparative Examples 1 to 4 was cut into the form of a circle having a diameter of 11.28 mm (1 cm$^2$) and sandwiched between columnar terminals having the same diameter. The resulting product (the current collector sandwiched between the terminals) was placed in a thermostat at 200° C. while the resulting product was in this state, a constant current of 1 mA was applied between the terminals to measure a voltage between the terminals, thereby calculating an electrical resistance value.
<Measurement of the Average Content of the Oxygen Element on the Copper Foil Surface>

For the copper foil of Example 1 (treated at 160° C.), the copper foil of Comparative Example 2 (not heat-treated) and the copper foil of Comparative Example 4 (treated at 140° C.), the average content of the oxygen element on the copper foil surface was measured by SEM/EDX.

More specifically, using an electron microscope (product name: JEOL-6610, manufactured by: JEOL Ltd.), spot measurement was carried out at an accelerating voltage of 20 kV and a working distance of 11 mm.

In this measurement condition, the average content of the oxygen element present within a thickness of 1.0 μm or less from a surface of the copper foil, was measured by Casta-ing's formula represented by the above-mentioned formula (1).
2. Evaluation of Battery Properties
<Production of Battery>

Example 4

A secondary battery was produced by use of the current collector of Example 1 as an anode current collector.

A ternary active material (particle diameter 1 to 10 μm) as a cathode active material, a crystalline sulfide solid electrolyte as a solid electrolyte, PVDF as a binder, and acetylene black as an electroconductive additive were used to prepare a mixture of the following composition: solid content 50 mass %; cathode active material/sulfide solid electrolyte=75:25; and 1.5 parts by mass of the binder with respect to 100 parts by mass of the cathode active material. The mixture was mixed with butyl acetate. The mixture was dispersed by use of an ultrasonic homogenizer (product name: UH-50, manufactured by: SMT) to produce a paste for producing a cathode mixture layer.

The paste was applied onto an aluminum foil having a thickness of 15 μm, which is a cathode current collector, by the doctor blade method and dried, thereby producing a cathode mixture layer attached to the cathode current collector.

Natural graphite as a raw material for an anode active material, a crystalline sulfide solid electrolyte as a solid electrolyte, and PVDF as a binder were used to prepare a mixture of the following composition: solid content 50 mass %; anode active material/solid electrolyte=58:42; and 1.1 parts by mass of the binder with respect to 100 parts by mass of the active material. The mixture was mixed with butyl acetate. The mixture was dispersed by use of the ultrasonic homogenizer (product name: UH-50, manufactured by: SMT) to produce a paste for producing an anode mixture layer.

The paste was applied onto the electroconductive layer of the current collector of Example 1, which is an anode current collector, by the doctor blade method and dried, thereby producing an anode mixture layer attached to the anode current collector.

PVDF as a binder and a crystalline sulfide solid electrolyte as a solid electrolyte were mixed with heptane at a solid content of the binder and solid electrolyte of 50 mass % and binder/solid electrolyte=5:95. The mixture was dispersed by use of the ultrasonic homogenizer (product name: UH-50, manufactured by: SMT) to prepare a solid electrolyte composition in the form of slurry. The solid electrolyte composition was applied to the anode mixture layer, and the solvent was evaporated, thereby producing an electrolyte layer attached to the anode mixture layer.

The above-produced cathode mixture layer, anode mixture layer and electrolyte layer were laminated so that the electrolyte layer is disposed between the cathode mixture layer and the anode mixture layer, thereby obtaining a battery for evaluation of battery properties.

Comparative Example 5

The secondary battery of Comparative Example 5 was produced in the same manner as Example 4, except that in place of the current collector of Example 1, a copper foil not comprising an electroconductive layer was used as the anode current collector, and the copper foil was not heat-treated.
<Evaluation of Battery Capacity>

At 25° C., each of the secondary batteries obtained in Example 4 and Comparative Example 5 was charged at a constant current of ⅓ C until the battery voltage reached 4.1 V and then discharged at a constant current of ⅓ C until the battery voltage reached 3.0 V. This operation was determined as one cycle. After three cycles of the operation, the battery capacity was measured.

The battery capacity of Example 4 was evaluated considering that the battery capacity of the battery of Comparative Example 5 is 100%.

3. Evaluation Results

Table 1 shows the substrate of the current collector, the heat treatment temperature, and the resistance measured at the time of overheating.

TABLE 1

| | Substrate | Heat treatment temperature (° C.) | Resistance ($\Omega \cdot cm^2$) at the time of overheating |
|---|---|---|---|
| Comparative Example 1 | Aluminum foil | Not heat-treated | 2306 |

TABLE 1-continued

| | Substrate | Heat treatment temperature (° C.) | Resistance ($\Omega \cdot cm^2$) at the time of overheating |
|---|---|---|---|
| Comparative Example 2 | Copper foil | Not heat-treated | 7 |
| Comparative Example 3 | Copper foil | 120 | 12 |
| Comparative Example 4 | Copper foil | 140 | 101 |
| Example 1 | Copper foil | 160 | 2110 |
| Example 2 | Copper foil | 200 | 2101 |
| Example 3 | Copper foil | 220 | 2209 |

Table 2 shows the results of analyzing the composition of the copper foil surface by SEM/EDX.

TABLE 2

| | Substrate | O (at %) | Cu (at %) |
|---|---|---|---|
| Comparative Example 2 | Copper foil (not heat-treated) | 0.4 | 99.6 |
| Comparative Example 4 | Copper foil (treated at 140° C.) | 4.3 | 95.7 |
| Example 1 | Copper foil (treated at 160° C.) | 10.5 | 89.5 |

Table 3 shows the results of evaluating the battery capacity.

TABLE 3

| | Substrate | Electroconductive layer | Capacity |
|---|---|---|---|
| Comparative Example 5 | Copper foil (not heat-treated) | No | 100% |
| Example 4 | Copper foil (treated at 160° C.) | Yes | 99% |

As shown in Table 1, for the current collector of Comparative Example 1 using the not-heat-treated aluminum foil, the resistance value increased to 2306 $\Omega \cdot cm^2$ when overheated at 200° C., and the electroconductive layer showed a high positive temperature coefficient resistance function.

However, for the current collector of Comparative Example 2 using the not-heat-treated copper foil, the resistance value was 7 $\Omega \cdot cm^2$ when overheated at 200° C., and the positive temperature coefficient resistance function was lower than the current collector of Comparative Example 1 using the aluminum foil.

For the current collectors of Comparative Examples 3 and 4 using the copper foils heat-treated at 120° C. and 140° C., their resistance values were 101 $\Omega \cdot cm^2$ or less when overheated at 200° C., which are lower than the current collector of Comparative Example 1 using the aluminum foil, and their positive temperature coefficient resistance functions were low.

Meanwhile, for the current collectors of Examples 1 to 3 using the copper foils heat-treated at 160 to 220° C., their resistance values increased to 2100 $\Omega \cdot cm^2$ or more when overheated at 200° C., and they showed the same positive temperature coefficient resistance functions as the electroconductive layer of Comparative Example 1 using the aluminum foil.

As shown in Table 2, the average content of the oxygen element of the copper foil surface of Example 1, which was heat-treated at 160° C., is 10.5 at %. Meanwhile, the average content of the oxygen element of the copper foil surface of Comparative Example 4, which was heat-treated at 140° C., is as small as 4.3 at %, and the average content of the oxygen element of the copper foil surface of Comparative Example 1, which was not heat-treated, is as small as 0.4 at %.

Therefore, it is considered that the copper foil surface is oxidized by heat treatment, and it is more heavily oxidized as the heating temperature increases.

The thermoplastic resin such as PVDF has such a property that it expands when heated to more than its melting point.

However, once the polymer chains are cut by the reduction function of copper, the thermoplastic resin is less likely to expand even when it is heated. Therefore, the positive temperature coefficient resistance function decreases.

As described above, when the copper substrate is heated at a temperature of 160° C. or more, the copper oxide layer that the average content of the oxygen element present within a thickness of 1.0 μm or less from the copper surface is 10.5 at % or more, is formed to inhibit the PVDF from being reduced by copper. Therefore, it is considered that the current collectors of Examples 1 to 3 showed the same positive temperature coefficient resistance function as the electroconductive layer of Comparative Example 1 using the aluminum foil.

Also, as shown in Table 3, as a result of comparing the battery of Comparative Example 5 (in which the not-heat-treated copper foil not comprising an electroconductive layer was used as the anode current collector) to the battery of Example 4 (in which the current collector of Example 1 heat-treated at 160° C. and comprising the electroconductive layer was used as the anode current collector), there is no large difference in battery capacity. Therefore, it is considered that at 25° C., which is a temperature at which batteries are generally expected to be used, there is no negative influence on battery properties such as battery capacity, even if the copper substrate that is generally used alone as the anode current collector, is heat-treated to be oxidized and form the copper oxide layer on the surface, and the copper oxide layer is covered with the positive temperature coefficient resistance layer.

From the above results, it is clear that the current collector in which, even in the case of using the copper substrate, the electroconductive layer comprising the thermoplastic resin and the electroconductive material provides the same positive temperature coefficient resistance function as the case of using the aluminum substrate, is provided by the disclosed embodiments.

The invention claimed is:

1. A method for producing a battery comprising an anode current collector and an anode mixture layer, the anode current collector comprising:
   a copper substrate comprising a copper oxide layer that an average content of an oxygen element present within a thickness of 1.0 μm or less from a surface of the copper substrate, is 10.5 atomic % or more and 20 atomic % or less, and
   a positive temperature coefficient resistance layer comprising a thermoplastic resin and an electroconductive material and covering the copper oxide layer of the copper substrate, and
   wherein said positive temperature coefficient resistance layer of the anode current collector and the anode mixture layer are in direct physical contact with each other, and
   the method comprising:
   oxidizing the copper substrate by heat-treating the copper substrate at 160° C. or more in a presence of an oxidizing gas, and
   covering the oxidized copper substrate with the positive temperature coefficient resistance layer comprising the thermoplastic resin and the electroconductive material.

2. The method for producing the battery according to claim 1, wherein, in the oxidizing of the copper substrate, the copper substrate is heat-treated at 160° C. or more for one or more hours under an air atmosphere.

3. The method for producing the battery according to claim 1, further including an electrolyte layer, a cathode mixture layer and a cathode current collector,
   the method further comprising:
   attaching the anode mixture layer and the electrolyte layer,
   attaching the electrolyte layer and the cathode mixture layer, and
   attaching the cathode mixture layer and the cathode current collector.

* * * * *